(12) United States Patent
Wang

(10) Patent No.: US 6,845,352 B1
(45) Date of Patent: Jan. 18, 2005

(54) FRAMEWORK FOR FLEXIBLE AND SCALABLE REAL-TIME TRAFFIC EMULATION FOR PACKET SWITCHED NETWORKS

(75) Inventor: Jay Wang, Morris Plains, NJ (US)

(73) Assignee: Lucent Technologies Inc., Murray Hill, NJ (US)

(*) Notice: Subject to any disclaimer, the term of this patent is extended or adjusted under 35 U.S.C. 154(b) by 0 days.

(21) Appl. No.: 09/533,396

(22) Filed: Mar. 22, 2000

(51) Int. Cl.[7] .......................... G06F 9/45; G06F 9/455; G06F 9/44
(52) U.S. Cl. ..................... 703/24; 703/21; 703/22; 702/182; 702/186; 709/224
(58) Field of Search ........................ 703/2, 13, 21, 703/22, 20, 23, 24, 25, 27, 17; 702/182, 186, 183, 185; 709/223, 224, 220, 221, 222; 704/4, 38, 32, 33, 37, 39, 47; 370/244, 245, 250, 396, 395, 395.3, 395.51, 395.52

(56) References Cited

U.S. PATENT DOCUMENTS

| | | | | |
|---|---|---|---|---|
| 5,197,127 A | * | 3/1993 | Waclawsky et al. | 709/224 |
| 5,394,540 A | * | 2/1995 | Barrington et al. | 703/21 |
| 5,408,465 A | * | 4/1995 | Gusella et al. | 370/231 |
| 5,440,719 A | * | 8/1995 | Hanes et al. | 703/21 |
| 5,592,657 A | * | 1/1997 | Johnson et al. | 703/21 |
| 5,732,213 A | * | 3/1998 | Gessel et al. | 709/224 |
| 5,748,617 A | * | 5/1998 | McLain, Jr. | 370/244 |
| 5,774,695 A | * | 6/1998 | Autrey et al. | 703/26 |
| 5,809,282 A | * | 9/1998 | Cooper et al. | 709/226 |
| 5,812,780 A | * | 9/1998 | Chen et al. | 709/224 |
| 5,838,919 A | * | 11/1998 | Schwaller et al. | 709/224 |
| 5,881,268 A | * | 3/1999 | McDonald et al. | 703/21 |
| 5,889,954 A | * | 3/1999 | Gessel et al. | 709/223 |
| 5,937,165 A | * | 8/1999 | Schwaller et al. | 709/224 |
| 6,134,514 A | * | 10/2000 | Liu et al. | 703/17 |
| 6,158,031 A | * | 12/2000 | Mack et al. | 714/724 |
| 6,189,031 B1 | * | 2/2001 | Badger et al. | 709/224 |
| 6,269,330 B1 | * | 7/2001 | Cidon et al. | 714/43 |
| 6,295,518 B1 | * | 9/2001 | McLain et al. | 703/23 |
| 6,363,424 B1 | * | 3/2002 | Douglas et al. | 709/224 |
| 6,393,386 B1 | * | 5/2002 | Zager et al. | 703/25 |
| 6,519,228 B1 | * | 2/2003 | Creamer et al. | 370/252 |
| 6,532,237 B1 | * | 3/2003 | Or et al. | 370/396 |
| 6,549,882 B1 | * | 4/2003 | Chen et al. | 703/21 |
| 6,560,720 B1 | * | 5/2003 | Chirashnya et al. | 714/32 |
| 6,601,195 B1 | * | 7/2003 | Chirashnya et al. | 714/43 |

OTHER PUBLICATIONS

Melamed, The Performance Analysis Workstation: An Interactive Animated Simulation Package For Queuing Networks, IEEE 1986.*

Mok et al., An Interactive Graphical Modeling Tool for Performance and Process Simulation, ACM 1993.*

* cited by examiner

Primary Examiner—W. D. Thomson

(57) ABSTRACT

An implementation framework, including methodologies and the architecture, for a real-time traffic emulation for packet switched networks. The framework uses extended finite state machines to model the traffic flows that are to be emulated. A simple yet flexible FMS-based scripting language is proposed to describe these flows. An event-driven approach to schedule CPU among flows is also adopted.

12 Claims, 4 Drawing Sheets

FRAMEWORK FOR FLEXIBLE AND SCALABLE REAL-TIME TRAFFIC EMULATION FOR PACKET SWITCHED NETWORKS

TECHNICAL FIELD

The present invention relates to traffic emulation for packet-switched networks.

BACKGROUND OF THE INVENTION

Traffic emulation for packet-switched networks is a process in which packet streams, that mimic the characteristics of a real workload, are artificially injected into the target network. Traffic emulation is an important technique in the context of network performance testing since it can potentially preclude the use of a large amount of equipment and of many human testers, which would otherwise be needed in order to facilitate the intended workload for the testing.

An instance of the application that generates traffic to the target network is known as an "application instance". Each application instance produces a stream of packets among the host computers, or endpoints, that are involved in the application instance. Some examples of application instances are: file download, streaming video and audio broadcast, and voice-over Internet Protocol (IP) telephony calls. Usually, a traffic emulation session involves multiple application instances and each application instance will involve two or more endpoints. By the same token, an endpoint can host several application instances simultaneously.

In the context of workload emulation, a "script" is an executable program that instructs an endpoint to emulate the traffic generated by an application instance. In a typical workload emulation implementation, the scripting language is "command oriented"; that is, a script contains a set of commands and related variables such that the endpoint executes a script by performing one command after another sequentially in an order given in the script. As an example of this, a (sender) endpoint may send a file to another (receiver) endpoint in which the scripts for such an instance may appear as follows:

| File Transfer Script for Sender Endpoint | File Transfer Script for Receiver Endpoint |
|---|---|
| BEGIN | BEGIN |
|   FileSize = 1000000; | |
|   PacketSize = 100; | |
|   DataRate = 100000; | |
|   ReceiverAddr = |   SenderAddr = |
|   "135.104.78.10" |   "135.104.78.34" |
|   CONNECT_REQ; |           CONNECT_ACK; |
|   WAIT_ACK; | |
|   LOOP |   LOOP |
|     SEND; |     RECEIVE; |
|   UNTIL EOF |   UNTIL |
| |   RCVD_DISCON_REQ |
|   DISCONNECT_REQ; |   DISCONNECT_ACK; |
|   WAIT_ACK; | |
| END | END |

In this example, the sender endpoint will first request for a connection to the receiver for a transfer of a file that has a size of 1000 thousand bytes. After the receiver acknowledges the request, the connection is established and the sender will then enter a loop in which the endpoint will continuously send packets to the receiver, 100 bytes each, at a rate of 100 thousand bytes per second, until the entire file is transmitted. Then, the connection between the sender and the receiver will be torn down. It should be understood that, in the example set forth above, what is shown here is a simplified, hypothetical scripting language, the purpose being to demonstrate a typical script structure and the fact that a script is a sequences of commands that deal with program execution control (such as LOOP, IF, and GOTO), variable assignment, and actual traffic emulation (e.g., SEND and RECEIVE).

As mentioned earlier, an emulation session usually involves the emulation of multiple active application instances at a given time. A common example may be found in that many telephone calls may be taking place over a network at the same time. In this case, an endpoint needs to execute multiple scripts concurrently, one for each application instance. To achieve such concurrency, a conventional emulation tool will create one "process" (or even "thread", which is a lightweight process that incurs less overhead than a typical process in terms of CPU cycles and memory) for each script and the emulator will rely on the process management subsystem of the underlying operating system to handle the CPU time-sharing among the scripts. However, in this approach, there are several shortcomings.

One notable shortcoming is limited emulation capacity. Particularly, there is an upper bound imposed by the operating system on the maximum number of processes or threads one can create. This number is usually less than a few hundred. Effectively, this will also be the maximum number of application instances that the emulator can accommodate.

Another shortcoming is poor scalability. Particularly, maintaining processes is expensive in terms of system resources, including CPU time and memory. Although threads are designed to keep such expenditures down, the overhead for a large number of threads can still be significant, which will in turn limit the scalability and the capacity of the emulator.

Finally, another notable problem is the lack of precise timing control. Particularly, since the sharing of CPU time is controlled by the operating system, it becomes difficult, if possible, to control the individual packet departure times, which is often critical for a credible performance analysis for IP-based applications. For example, in a given flow, assume that one may wish to emit one packet for every 1 millisecond. When many scripts are sharing the CPU and when a packet is due for emission, it is likely that at this moment the CPU is performing some other less urgent task for some other process. The emulator has little control on the CPU time scheduling.

In view of the foregoing, a need has been recognized in connection with providing traffic emulation that obviates the shortcomings and disadvantages discussed above, among others.

SUMMARY OF THE INVENTION

In accordance with at least one presently preferred embodiment of the present invention, a system for providing traffic emulation for packet-switched networks is broadly contemplated, wherein the system includes an endpoint and an emulator module associated with the endpoint, the emulator module including at least one finite state machine for modeling traffic flows to be emulated.

Also broadly contemplated in accordance with at least one presently preferred embodiment of the present invention is a method of providing traffic emulation for packet-switched networks, the method including the provision of an endpoint and of an emulator module associated with the endpoint, wherein the provision of an emulator module includes providing at least one finite state machine for modeling traffic flows to be emulated, and wherein the method further includes modeling traffic flows with the at least one finite state machine.

Other and further features and embodiments of the present invention will become apparent during the course of the following discussion and by reference to the accompanying drawings.

BRIEF DESCRIPTION OF THE DRAWINGS

Referring now to the drawings.

DESCRIPTION OF THE PREFERRED EMBODIMENTS

As employed herein, the term "network" may be construed as referring to a packet-switched network system. Also, as employed herein, the terms "workload" and "traffic" may be considered to be interchangeable.

For the purpose of providing background for the ensuing discussion, traffic to a network may be considered to be a set of flows. Each flow is associated with two endpoints, "source" and "destination", where, respectively, the traffic is initiated by the source endpoint and terminated by the destination endpoint. It will be appreciated that this does not imply that there will be no packet, particularly control packets, flowing from the destination to the source.

A flow is described by a flow descriptor which contains the following information:

| | |
|---|---|
| FlowDescriptorId | //identification for this flow descriptor |
| ProtocolType | //protocol type, e.g., TCP, UDP, and RTP |
| SrcIPAddr | //source endpoint IP address |
| DestIPAddr | //destination endpoint IP address |
| MeanIAT | //mean packet inter-arrival time |
| MinIAT | //minimum packet inter-arrival time |
| MaxIAT | //maximum packet inter-arrival time |
| IATDist | //inter-arrival time distribution, e.g., //Constant, Uniform, Negative Exponential |
| MeanSize | //mean packet size |
| MinSize | //minimum packet size |
| MaxSize | //maximum packet size |
| SizeDist | //packet size distribution |
| MeanDuration | //mean flow duration |
| MinDuration | //minimum flow duration |
| MaxDuration | //maximum flow duration |
| DurationDist | //flow duration distribution |

It should be understood that it is not necessary that all attributes in the flow descriptor are needed for a given flow. For example, in the case of a uniform distribution, the mean for the distribution is not needed. By the same token, additional attributes can be included as needed. It should also be appreciated that a flow does not necessarily correspond to a single application instance. Instead, it is possible to aggregate multiple application instances into a single flow for a proper level of granularity such that, as in the example presented further below, one flow in one case may correspond to only one application instance, but may correspond to many application instances in some other cases. So in the former case, the flow has a 'finer' granularity while in the later case the flow has a 'coarser' granularity.

In the present example, some flow descriptor attributes have to be adjusted accordingly. For instance, if a flow is specified that is an aggregation of 100 voice calls, then the MeanIAT of the flow will be one hundredth of that of a single call.

Figure 1:
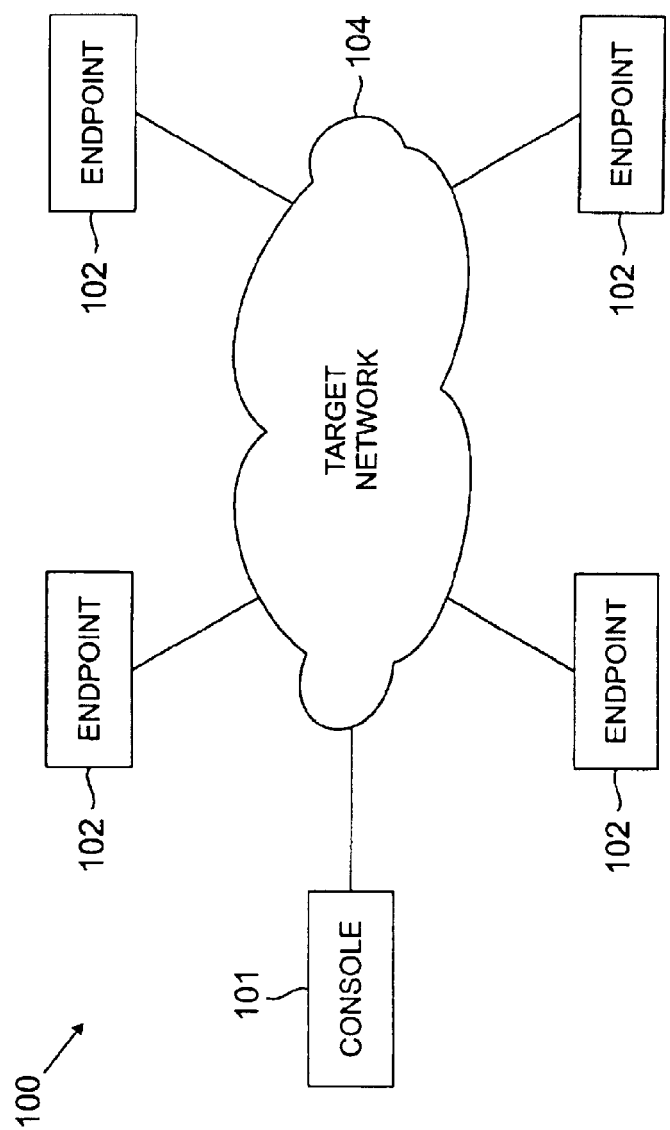
FIG. 1 is a schematic overview of a system architecture in accordance with an embodiment of the present invention.

Turning now to an architecture that may be employed in accordance with at least one embodiment of the present invention, an emulator 100 may preferably include a console 101 and two or more endpoint hosts 102 connected by a target network 104, as shown in FIG. 1. Although essentially any number of endpoint hosts 102 is conceivable, four are shown in FIG. 1 for non-restrictive, illustrative purposes.

The endpoints 102 preferably emulate the intended workload by running the corresponding scripts. Each script specifies the behavior of a half-flow (i.e., either the source end or the destination end). The console 101 is preferably a central controller that coordinates the activities among endpoints 102. The console 101 is also responsible for configuring the emulation and reporting the emulation results to the user through its user interface.

All the packets exchanged among endpoints 102 and the console 101 will preferably fall into two categories: "control" and "data". A control (or signaling) packet preferably contains a signal that indicates a particular event for a purpose of emulation control. On the other hand, the data packets are preferably the ones that actually emulate the real workload. Typically, the extra load generated by the signaling packets to the network is very small relative to the data traffic. Therefore the impact to the performance caused by the signaling packets is minimal.

Figure 2:
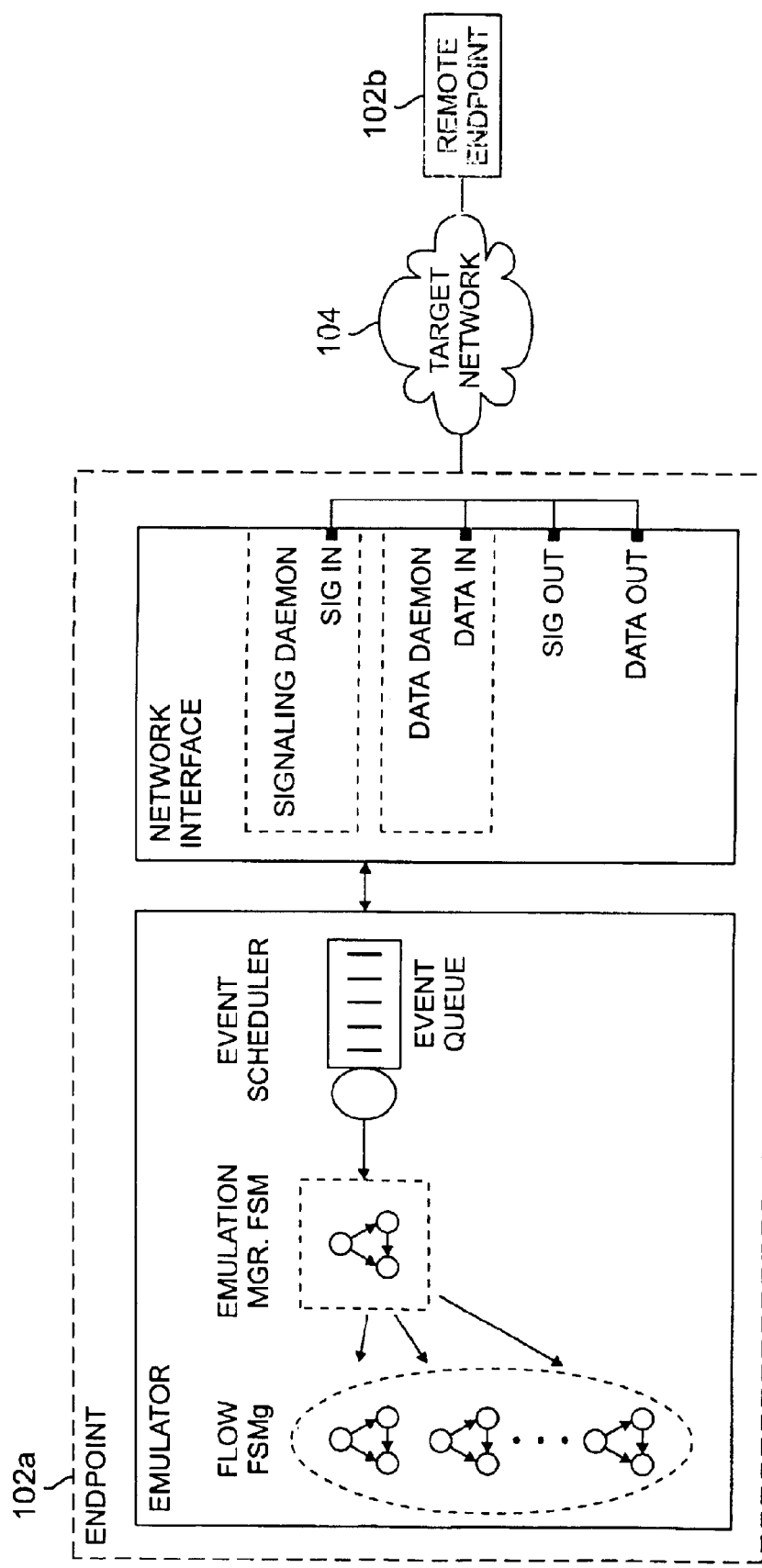
FIG. 2 is a schematic overview of an endpoint architecture.

As shown in FIG. 2, in order to transport signaling and data traffic, each endpoint 102 preferably has four logical ports: sigIn, sigOut, dataIn, and dataOut. As suggested by their names, the ports sigIn and sigout are used solely for input and output of control packets for the endpoint. Similarly, dataIn and dataOut are used exclusively for transmitting and receiving data packets for the endpoint. Preferably, separate logical ports are used for data and control messages because the delivery of control messages has to be reliable (e.g., transmission control protocol (TCP)) while data transportation, depending on the emulated protocol, can be lossy (e.g., UDP). (UDP, or User Datagram Protocol, is part of the TCP/IP protocol suit that provides transport service that is lossy, i.e., with no guarantee of no-loss packet delivery.)

As shown in FIG. 2, a given endpoint 102a preferably contains two main modules, Network Interface and Emulator, run by three processes. (A remote endpoint is indicated, for illustrative purposes, at 102b.) In the Network Interface module, there are preferably two processes running in the background responsible for receiving packets from the dataIn and sigIn ports. These two processes will be referred to as the data daemon and signaling daemon. The rest of the system is run on the main process that handles the main emulation work and the sending of packets. Separate background processes are preferably created for receiving data and signaling packets so that waiting for input does not block the normal emulation activities. Although the I/O can be implemented in a non-blocking way, this however requires the process to continuously poll the I/O ports, which causes higher overhead.

Preferably, the emulation employed in accordance with at least one embodiment of the present invention utilizes an event-driven approach. Therefore, a main component in Emulator module is an Event Scheduler that contains an event queue. An Emulation Manager is preferably the main controller which also manages the flows that the endpoint 102a emulates. The Emulation Manager preferably contains a finite state machine (FSM) that maintains the status of the emulation. Also, for each flow there is preferably a corresponding FSM. The Emulator module and the roles of the FSMs will be described in greater detail further below.

For a console 101 (See FIG. 1), the architecture is preferably very similar to that of the endpoint. However, a console 101 will preferably not include adata daemon (hence the dataIn and dataOut ports either) and the individual flow FSMs. In place of the data daemon, a UI daemon is preferably used, which accepts user's commands, turns them into events, and places them in the event queue along with other events to be processed by the main process. A separate process UI daemon is preferably created so that the user is allowed to initiate an event at any time during an emulation session.

Turning now to FSM-based modeling and scripting, it will be noted that, as mentioned earlier, a script specifies a half-flow. In contrast to a command-oriented language, however, the present invention broadly contemplates, in accordance with at least one preferred embodiment, that the scripting language is based on extended finite state machines (EFSMs). That is, an endpoint will preferably create a FSM according to the corresponding script for each half-flow associated with the endpoint. To illustrate this, reference is made to the concrete example of file transfer discussed in the "Background of the Invention" section:

---

File Transfer Script for Source Endpoint

ScriptName       = FILE_TRANSFER_SOURCE
Role             = SOURCE
FlowDescriptorID = FILE_TRANSFER
<BEGIN, CONNREQ, eStart>
<CONNREQ, CONNREQ, eConnReqAck>
<CONNREQ, TRANS, eTransDdata>
<TRANS, TRANS, eTransData>
<TRANS, END, eTearAck>
eStart: remote eConnReq
eConnReqAck: eTransData
eTransData: <EOF? remote eTear: eTransData>
eTearAck: NULL File Transfer Script for the Destination Endpoint ScriptName       = FILE_TRANSFER_DESTINATION
Role             = DESTINATION
FlowDescriptorID = FILE_TRANSFER
<BEGIN, CONNREQ, eStart>
<CONNREQ, CONNREQ, eConnReq>
<CONNREQ, TRANS, eTransData>
<TRANS, TRANS, eTransData>
<TRANS, END, eTear>
eStart: NULL
eConnReq: remote eConnReqAck
eTransData: NULL
eTear: remote e_TearAck

---

From the above, it may be observed that each script has three sections that, respectively, specify flow variable values, state transitions, and event actions. In the variable assignment section, the user needs to specify whether the script is for the source or the destination endpoint. The user also has to tell the system which flow descriptor the script will use. The second section of the script describes the state transitions. Each state transition will preferably have the following format:

<ST1, ST2, eEvnt>

The meaning of the above statement is that if the state machine is currently at a state ST1, then upon the arrival of event eEvnt the state will perform the job associated with the event and take a transition to change its state to ST2.

Figure 3:
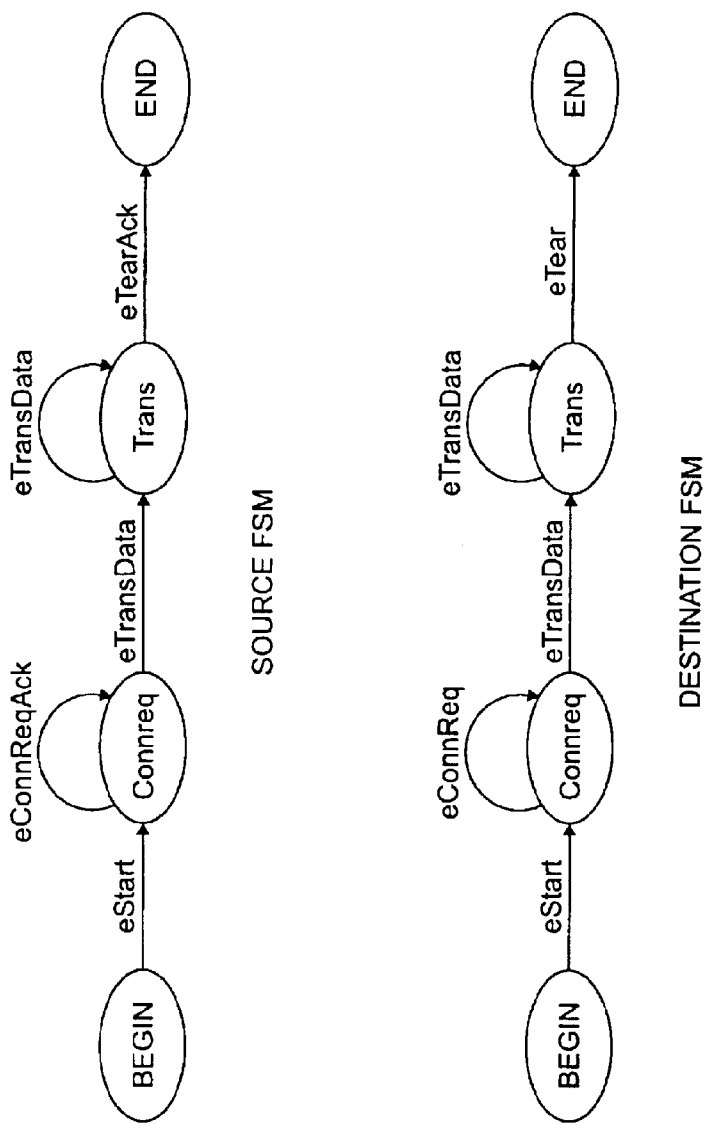
FIG. 3 is a schematic representation of finite state modules.

The state transitions shown here (i.e., both in the above file transfer example and in the state transition format) may be represented graphically as in FIG. 3, where the circles and arrows represent states and events, respectively.

As will be appreciated from FIG. 3, in order to keep the emulation going, an event may have to create another event to drive the state machine. For example, the event eTransData in the source endpoint is involved with forming a data packet based on the corresponding flow descriptor and send it to the destination endpoint. After that, if the flow is not yet complete, then the event has to create another eTransData event to trigger the system to send the next data packet. This is preferably specified in the third section of a script in which each statement has the following format:

eEvent [remote] eNextEvnt

The meaning of the above statement is that when the event eEvnt occurs, the system should create another event eNextEvnt after the execution of eevnt. In the case when there is a preceding word 'remote', the event eNextEvnt is generated for the "peer" state machine instead of itself Destination endpoint is the peer of the source, and vice versa. In the case of NULL, it simply means that no event needs to be generated (local or remote). The generation of an event can also be conditional as shown in the following example:

eTransData: <EOF? remote eTear: eTransData>where the key word EOF represents "end of flow". Therefore, this statement means that if the condition is true (in this case end of flow), the system should generate a remote eTear event to its peer to request for a session tear down. Otherwise, a (local) eTransData should be generated for the next data packet.

The disclosure now turns to FSM-based event-driven emulation. Particularly, as indicated earlier, the emulation is preferably driven by individual events. In other words, the entire task of emulation is broken up into many small jobs and the execution of each job is triggered by a corresponding event.

An event is preferably implemented by a software object that contains a name, a timestamp, a flow id, and a variable data portion. The event name, for example estart, eConReq, and eTransData, identifies the event. The timestamp indicates the time when the event should be executed. The flow id indicates the associated flow for the event. The data portion of an event is used to store any event-specific data.

At the endpoint, events are queued up in the event queue of the scheduler ordered by their timestamp values. That is, events that have smaller timestamp values will be placed closer to the front of the queue. A new event may be generated locally by the execution of another event or by the arrival of a packet from a remote endpoint or the console. An emulation session proceeds simply with the Emulator continuing to process the first event in the queue until the exit criteria is met, for example, when all flows reach end state.

Figure 4:
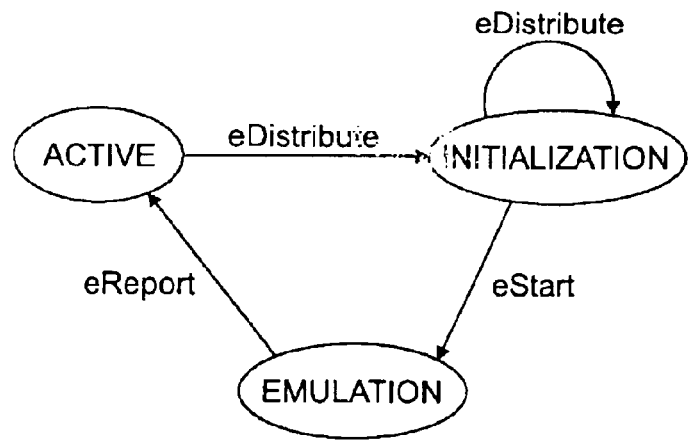
FIG. 4 is a schematic representation of an emulation manager finite state module.

Preferably, the Emulator, in an endpoint, contains an Emulation Manager FSM and a flow FSM for each half-flow that the endpoint is emulating. An example of a flow Emulation Manager FSM is shown in FIG. 4. On the other hand, flow FSMs are preferably created based on the corresponding scripts, and examples of flow FSMs are shown in FIG. 3.

As shown in FIG. 4, the Emulation Manager FSM, which indicates that an emulation session has three stages (initialization, emulation, and result reporting), is preferably used to maintain the status of the endpoint. The details of each of these stages are explained next.

For initialization, in order to perform an emulation, the user first has to prepare the script(s) and the flow descriptor (s) on the console. After they are ready, the console will distribute them to endpoint(s) by way of eDistribute events. The data in each eDistribute event preferably contains the following information: flow script, flow descriptor, and number of flows so that the event gives the endpoint the flow script and its corresponding descriptor. It also tells the endpoint how many flows should be created using this script. The console will use one eDistdbute event for distributing each script to the target endpoint. During the initialization stage, the endpoint will create a flow FSM for each half-flow, establish proper channels (e.g., TCP, UDP) according to the script for data transportation with its peer(s), and perform any other needed initialization work. At this point, the Emulation Manager FSM will be in the state of Initialization.

Regarding emulation, after all the scripts are distributed to all endpoints and when the endpoints are done with initialization, the console will preferably start the emulation by sending an eStart event to each endpoint. Upon executing the event, the Emulation Manager will pass the event to each of its flow FSMs (see FIG. 2) and take a transition to state Emulation. For each flow FSM, eStart is the first event and it initiates the emulation for the corresponding flow. For the subsequent events that arrived at the endpoint, the Emulation Manager will pass the event to the intended flow (according to the flow id in the event structure). When the end state is reached for all flows, the Emulation Manager will notify the console that the emulation for the endpoint has been completed.

Finally, with regard to result reporting, after all the endpoints have finished their emulation, the console will request that each of the endpoints, by way of eReport event, report the emulation results for each flow it emulated. Upon executing the event, the endpoint will send statistics (e.g., throughput, packet loss rate, and packet delay) to the be console and return to the Active state. After all the endpoints are done, the console will be able to show the collective results to the user.

Figure 5:
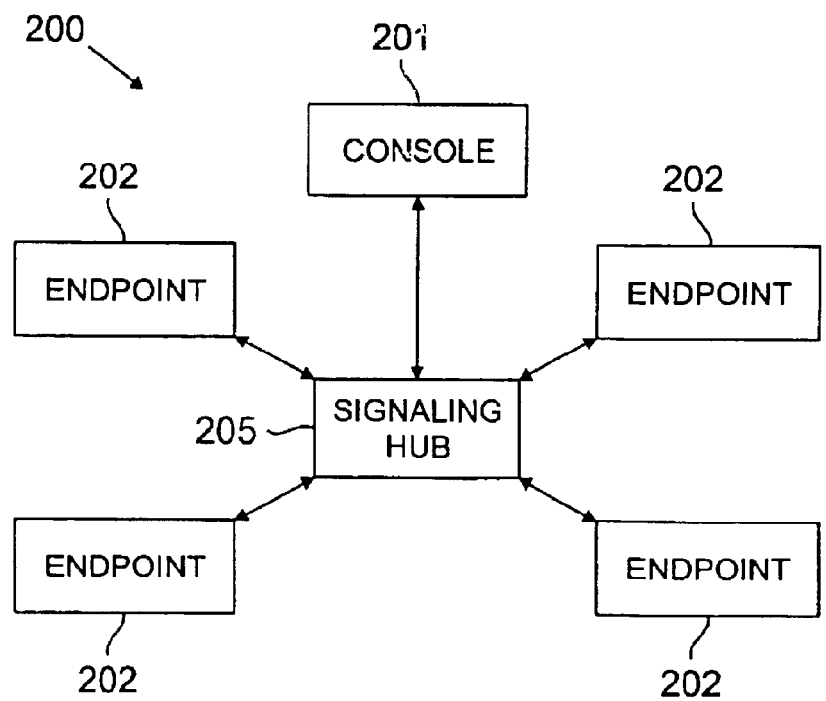
FIG. 5 is a schematic representation of a signaling subnet with star topology.

The disclosure now turns to a discussion of signaling topology, an example of which is shown in FIG. 5. Shown in FIG. 5 are a console 201 and several endpoints 202 in communication with a signaling hub 205.

It will be appreciated that, since the delivery of control messages has to be reliable (i.e., error free, no loss, and preserved sequence), a reliable protocol like transmission control protocol (TCP) may be used. However, because TCP is connection-oriented, this would require an endpoint 202 to establish a TCP virtual circuit (VC) to the console and to each of the associated endpoints 202. Two endpoints 202 are "associated" if they terminate (being either the source or the destination) a common flow. By doing so, in the worse case, there needs to be $O(n^2)$ VCs for the entire system, where n is the total number of endpoints. Nonetheless, it is not expected that this presents a scalability problem because the number of VCs on each endpoint, each of which is run by a separate host computer, grows only linearly. Otherwise, one may create a star-based virtual signaling subnet 200 as shown in FIG. 5, where all the signaling packages are first sent to the hub 205, which in turn 'switches' the packet to the intended recipient. Note that for convenient implementation, the console 201 can also play the role of hub 205. With such a topology, whether or not the console 201 plays the role of hub 205, the total number of VCs is reduced to O(n) although at a cost of a less expeditious control signal delivery due to an extra hop introduced by the topology.

The disclosure now turns to a discussion of several advantages, and some further exemplary details, associated with emulation in accordance with at least one preferred embodiment of the present invention.

One important requirement of an emulator is to be able to emulate multiple flows concurrently simply because in reality many flows can happen simultaneously in the target network. It will be appreciated that it would not be a viable solution to use one physical processor for each flow. To achieve concurrency for emulating multiple flows, a conventional solution is to create and map a process or a thread (a light weight process) to each flow and let the underneath operating system to schedule the CPU time among these processes or threads. However, this approach does not scale because such approach imposes an upper bound on the maximum number of flows that can be emulated (i.e., the maximum number of processes or threads one may create). In addition, it will incur increasing overhead (both CPU time and memory) as the number of flow increases. In contrast, an approach in accordance with at least one embodiment of the present invention will place no such bound and the overhead is independent of the number of flows, since only a small constant number (e.g., three) of processes is used, regardless of the number of flows.

It will be appreciated that one important purpose of an emulation run is to place on the target network some traffic that mimics the real workload in terms of timing and data volume. Therefore, given a flow for the source endpoint, the emulator is to produce a sequence of packets according to the following sequences $T=<t_1, t_2, \ldots t_n>$ and $S=<s_1, s_2, \ldots s_n>$, where $t_i$ and $s_i$, $1<=i<=n$, are the departure time and the size, respectively, of the $i_{th}$ packet, and n is the total number of data packets in the flow. The closer to S and T the emulator may create and emit packets, the more accurate the emulation is. It should be noted that, in practice, T and S could be derived stochastically or obtained from a trace. For the destination endpoint, the sequence T, on the other hand, represents the actual times when the packets arrive. So for the destination, a typical objective of an emulator is to accurately record the size and the arrival time for each arriving packet (so that throughput, delay, loss ratio, and other performance statistics can be properly derived).

In an approach according to at least one embodiment of the present invention, each packet is created and sent individually based on a triggering event. As a result, one can easily achieve any arbitrary packet size that varies from one packet to another, thus matching S exactly. However, due to a finite CPU power, the same can not be said for T. To be more specific, when the CPU is heavily loaded, a conventional emulator may miss its schedule in injecting a data packet into the network (or picking up from the port for the case of destination). However, the event-driven approach according to at least one embodiment of the present invention facilitates a solution that provides an opportunity to optimize the emulation timing accuracy. A proper process prioritization and a centralized scheduling algorithm, which will be discussed in more details further below, achieve this.

As described earlier, the endpoint software uses three processes, namely the signaling daemon, the data daemon, and the main process. They are preferably prioritized such that the control daemon has a higher priority while the main process and the data daemon has a lower priority. The control daemon is given a higher priority in order to ensure that control messages, which tend to be more urgent, will always be picked up by the endpoint in a timely manner. However, because the volume of control messages is expected to be very small, particularly during the data transmission state, there will be in general no signaling packet for a flow. The effect of signaling packets to emulation results is typically negligible.

Now one may consider the event scheduler on the main process. At any given moment, assume that the timestamp of the first event in the scheduler's event queue is to and assume that the current wall clock time is t. Let $ä_t = t - t_0$. Then if $ä_t \sim 0$, the Emulator is just on time. Otherwise if $ä_t > 0$, the Emulator has missed the time schedule for the event. Under both conditions the Emulator should execute the event as soon as possible. On the other hand, if at $ä_t > 0$, this means the Emulator is ahead of the schedule. In this case, if $|ä_t|$ is too large, it is undesirable to execute the event immediately because this will result in executing the event prematurely (and hence lead to an inaccurate emulation). Therefore, one may compare a, with a predefined small positive constant called LOOKAHEAD. The value of LOOKAHEAD represents the estimated (wall-clock) time required to process an event before a corresponding data packet (if any) is actually sent by the hardware. The Emulator will execute the event only if d, is approximately equal to LOOKAHEAD. Otherwise, the main process will either put itself asleep (hence giving up the CPU) for some time (or just enter a busy loop if the difference between a, and LOOKAHEAD is smaller then the granularity of the sleep mechanism supported by the operating system) until this condition is met. The event scheduling strategy described here is to maximize emulation accuracy while maintaining good CPU efficiency. It should be noted that, in the implementation this busy-looping mechanism can be made optional so that the user can turn it off to accommodate scenarios when the importance of generator capacity outweighs accuracy. In this case, if the difference between at and LOOKAHEAD is no larger than the smallest possible sleep unit, the Emulator will proceed to process the event.

It is clear that no matter how the CPU is scheduled, when the load given to the emulator exceeds certain limit, the emulator will start to fall behind the execution schedule for its events simply because the CPU power is finite. In particular, this threshold may vary over time since the CPU may not be used exclusively by the emulator. Therefore, it is beneficial that the emulator provides a quantified indication as to how well (or poorly) the timing requirement are met by the emulator in a particular run as a base for validation. For this purpose, one may define two emulation accuracy indexes $\alpha$ and $â$ as follows:

$$\alpha = \sum_{i=1...n} (|d'_i - d_i|)/n/E(D),$$

and $$â = |\{d'_i | d'_i > d_i \text{ for } i=1 \ldots \}|/n$$

where $d_i$ and $d'_i$ denote the expecyed departure time and the actual departure time of packed i, respectively, for a given flow. Also, D is the random variable representing the packet inter-departure time for the flow. Therefore, when the value of a increases the accuracy (or the 'quality') of the emulation deteriorates. The value of $â$ indicates how often the emulator misses an event's scheduled time in an emulation run. The index a is also useful in helping fine tuning LOOKAHEAD whose optimal value is system dependent.

The emulation in accordance with at least one embodiment of the present invention also allows the user to interact with the endpoints during an emulation session. For example, assume that the user wants to abandon the run or change some parameters (e.g., data rate) of some flows during an emulation. Then the console may issue the command to the endpoint during the run (by embedding the commanding a signaling packet and sending it to the corresponding endpoint(s) through the signaling port). Such interaction is made easy since the flow logic is separated from the logic of general emulation control by creating separate FSMs for flows and emulation management (see FIG. 2). In addition, by giving the control daemon a higher priority, it is ensured that the control command will be handled quickly.

The EFSM-based scripting approach according to at least one embodiment of the present invention allows great flexibility for users to define their application instances. In the simplest case, the emulator may provide some predefined scripts for most popular applications such as ftp and VoIP (i.e., voice over IP calls) so that emulating these applications would require no user programming. For more sophisticated users, the tool may also allow the users to create their own application instances by constructing FSM's that comprise system-defined events (i.e., events whose behavior is defined by the tool) and proprietary events that users create by themselves.

Furthermore, the EFSM-based modeling allows the tool to adopt a graphical user interface that uses the graphical representation of the FSMs (as illustrated in FIG. 3) to display scripts. Potentially, this allows users to maintain their scripts graphically for better user friendliness.

Several possible applications for emulation in accordance with at least one embodiment of the present invention are network testing, flow QoS (quality of service) validation, performance probing and monitoring, and traffic profiling. In the case of traffic profiling, one may use an endpoint to receive a stream of packets and establishes a stochastic profile of that traffic stream, for example, for the purpose of studying the network (queueing) effect to a known traffic source.

Although a traffic generator formed in accordance with at least one presently preferred embodiment of the present invention may be used in a desktop environment, it should be pointed out that the endpoint software could also be integrated directly into the target network (e.g., built into an IP edge router) as an embedded application.

It is to be understood that there exist various modifications to the above-described arrangements that are considered to fall within the spirit and scope of the present invention. Such modifications are all considered to be within the scope of the present invention as defined by the claims appended hereto.

What is claimed is:

1. System for providing traffic emulation for packet-switched networks, said system comprising:
   an endpoint; and
   an emulator module associated with said endpoint;
   said emulator module comprising at least one finite state machine for modeling a number of traffic flows to be emulated, said emulator module operable to maintain simultaneous emulation of the number of traffic flows using a constant number of processes, the number of traffic flows being larger than the constant number of processes, the number of processes being small relative to the number of traffic flows that can be emulated, the number of processes required for emulation being independent of the number of traffic flows to be emulated.

2. The system according to claim 1, wherein said emulator module comprises an emulation manager, said emulation manager comprising a finite state machine for maintaining the status of an emulation operation.

3. The system according to claim 2, wherein said finite state machine of said emulation manager comprises three stages, said three stages comprising an initialization stage, and emulation stage and a result reporting stage.

4. The system according to claim 1, wherein:

said endpoint further comprises a network interface module for facilitating the communication of flows to a network; and said at least one finite state machine comprises a plurality of finite state machines, wherein each finite state machine corresponds to a different one of said flows.

5. The system according to claim 4, wherein said network interface module comprises:

at least one port for receiving data;

at least one port for receiving signals;

a first background process for managing the receipt of data at said at least one data port; and a second background process for managing the receipt of signals at said at least one signal port.

6. The system according to claim 1, wherein said emulator module further comprises an event scheduler, said event scheduler comprising an event queue.

7. Method of providing traffic emulation for packet-switched networks, said method comprising:

providing an endpoint; and providing an emulator module associated with said endpoint;

said step of providing an emulator module comprising providing at least one finite state machine for modeling a number of traffic flows to be emulated, said emulator module operable to maintain simultaneous emulation of the number of traffic flows using a constant number of processes, the number of traffic flows being larger than the constant number, of processes the number of processes being small relative to the number of traffic flows that can be emulated, the number of processes required for emulation being independent of the number of traffic flows to be emulated; and modeling traffic flows with said at least one finite state machine.

8. The method according to claim 7, wherein:

said step of providing an emulator module comprises providing an emulation manager;

said step of providing an emulation manager comprises providing a finite state machine for maintaining the status of said emulation; and said method further comprising maintaining the status of said emulation with said finite state machine of said emulation manager.

9. The method according to claim 8, wherein:

said step of providing a finite state machine for maintaining the status of said emulation comprises providing three stages, said three stages comprising an initialization stage, and emulation stage and a result reporting stage; and said method further comprises:

performing each of said three stages in the following sequence: initialization stage, emulation stage and result reporting stage; and thereafter returning to said initialization stage.

10. The method according to claim 7, wherein:

said step or providing an endpoint comprises providing a network interface module for facilitating the communication of flows to a network; and said step of providing at least one finite state machine comprises providing a plurality of finite state machines, wherein each said finite state machine corresponds to a different one of said flows.

11. The method according to claim 10, wherein said step of providing a network interface module comprises providing:

at least one port for receiving data;

at least one port for receiving signals;

a first background process for managing the receipt of data at said at least one data port; and a second background process for managing the receipt of signals at said at least one signal port;

said method further comprising:

managing the receipt of data at said at least one data port with said first background process; and managing the receipt of signals at said at least one signal port with said second background process.

12. The method according to claim 7, wherein said step of providing an emulator module comprises providing an event scheduler, said event scheduler comprising an event queue.

* * * * *